United States Patent [19]

Foglar et al.

[11] Patent Number: 5,200,950
[45] Date of Patent: Apr. 6, 1993

[54] METHOD AND CIRCUIT ARRANGEMENT FOR REDUCING THE LOSS OF MESSAGE PACKETS THAT ARE TRANSMITTED VIA A PACKET SWITCHING EQUIPMENT

[75] Inventors: Andreas Foglar; Peter Rau, both of Munich, Fed. Rep. of Germany

[73] Assignee: Siemens Aktiengesellschaft, Munich, Fed. Rep. of Germany

[21] Appl. No.: 690,360

[22] Filed: Apr. 24, 1991

[30] Foreign Application Priority Data

Apr. 27, 1990 [EP] European Pat. Off. ........ 90108055.6

[51] Int. Cl.$^5$ .............................................. H04L 1/22
[52] U.S. Cl. ........................................ 370/16; 371/8.2; 371/11.2; 370/13; 370/60.1
[58] Field of Search ............... 370/58.1, 58.2, 58.3, 370/60, 60.1, 94.1, 94.2, 16, 13; 371/8.1, 8.2, 11.1, 11.2

[56] References Cited

U.S. PATENT DOCUMENTS

| | | | |
|---|---|---|---|
| 4,455,645 | 6/1984 | Mijioka et al. | 370/16 |
| 4,730,303 | 3/1988 | Suzuki | 370/60 |
| 5,084,867 | 1/1992 | Tachibana et al. | 370/16 |

FOREIGN PATENT DOCUMENTS 0108555 5/1984 European Pat. Off. .
0321050 12/1987 European Pat. Off. .

OTHER PUBLICATIONS

Schneider H., "Mit ATM . . . Kommunikation", Telcom Report, vol. 13, No. 1, 1990, pp. 4–7.
Newman P., "A Broad-Band . . . Communications", IEEE Infocom '88, New York, 1988, pp. 0019–0028.

Primary Examiner—Douglas W. Olms
Assistant Examiner—Wellington Chin
Attorney, Agent, or Firm—Hill, Steadman & Simpson

[57] ABSTRACT

In order to reduce the loss of message packets that are transmitted in the course of virtual connections in an asynchronous transfer mode and which comprise a packet header identifying the respective virtual connection, the message packets being respectively augmented by a continuous auxiliary identifier and, after multiplication, being separately transmitted via redundant switching matrices of a packet switching equipment, it is provided that, with reference to the auxiliary identifier, only that message packet transmitted without fault as a first of the multiplied message packets and having an auxiliary identifier that is the next one following the most recently-transmitted message packet is forwarded. In addition, that switching matrix by way of which the transmission of message packets respectively occurs most slowly is identified and message packets that are transmitted via the respective slowest switching matrix as the first of the multiplied message packets are forwarded.

7 Claims, 1 Drawing Sheet

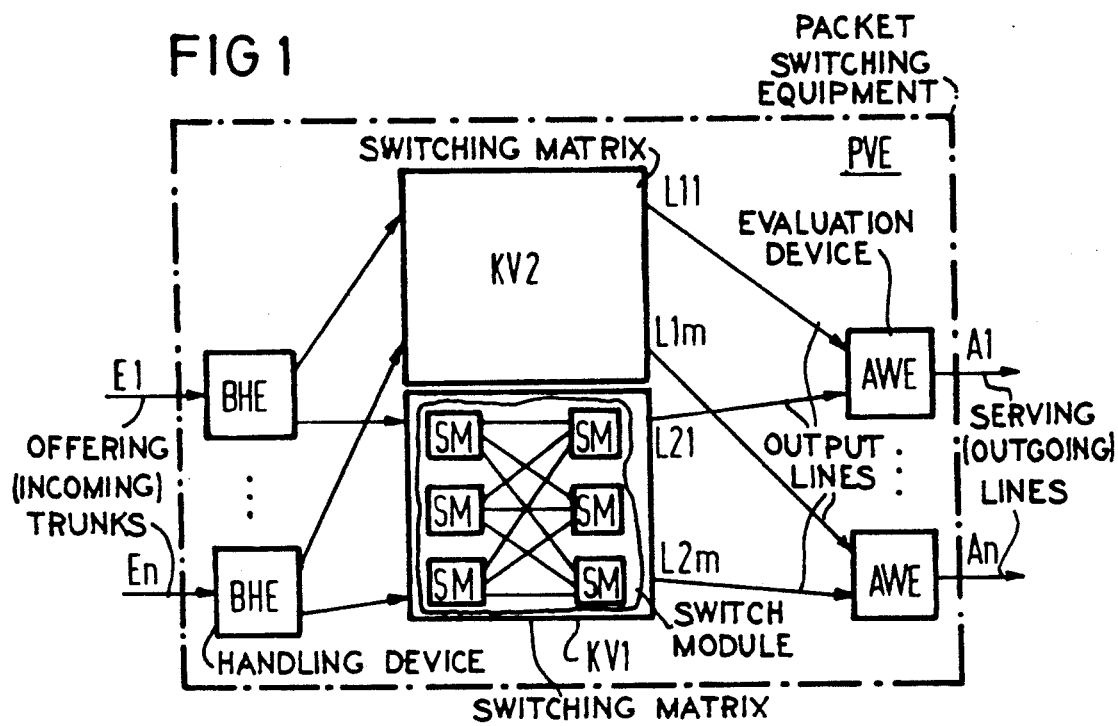
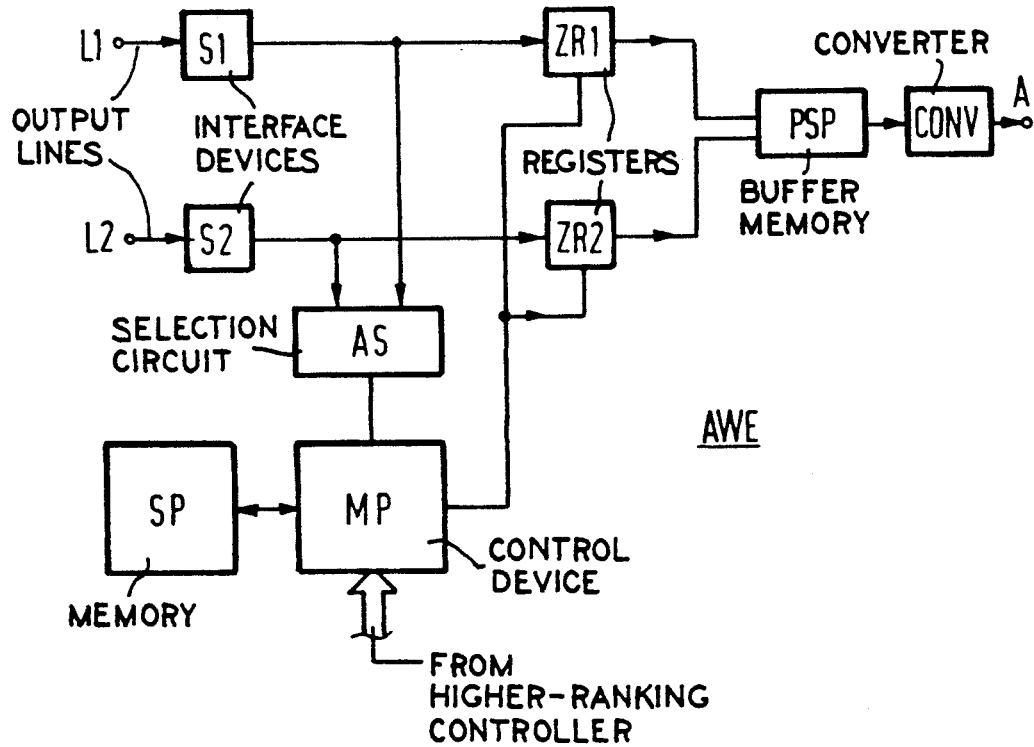

METHOD AND CIRCUIT ARRANGEMENT FOR REDUCING THE LOSS OF MESSAGE PACKETS THAT ARE TRANSMITTED VIA A PACKET SWITCHING EQUIPMENT

CROSS REFERENCE TO RELATED APPLICATION

This application is related to an application Ser. No. 678,046 filed Apr. 1, 1991.

1. Field of the Invention

The present invention relates to a method and to an apparatus for forwarding cells, that are referred to below as message packet transmitted on offering trunks in the course of virtual connections in an asynchronous transfer mode.

2. Description of the Prior Art

It is generally known in the art, through the European patent application 89 103 798.8 to provide a method and apparatus for forwardly message packets transmitted on offering trunks in the course of virtual connections in an asynchronous transfer mode in which the packets have a packet header that identifies the respective virtual connection via a packet switching equipment which comprises at least two redundant switching matrices feeding serving lines, whereby a message packet group having a plurality of identical message packets corresponding in number to the plurality of redundant switching matrices is formed by multiplication of each of the message packets transmitted on one of the offering trunks in the course of a virtual connection. An identical auxiliary identifier that changes for successive message packet groups is attached to each of the message packets of a message packet group and the message packets of a message packet group are separately transmitted across the redundant switching matrices in the direction of the serving line coming into consideration for the respective virtual connection. Only one of the message packets belonging to a message packet group is forwarded to the serving line coming into consideration after such a transmission across the redundant switching matrices, the message packet being forwarded on the basis of the auxiliary identifier respectively attached to the message packets.

As mentioned above, such a method and circuit arrangement have already been disclosed in the European patent application 89 103 798.8.

Given a faulty transmission of a message packet in this method or by way of this circuit arrangement, a loss of an entire message packet cycle can occur that can cover, for example, a plurality of 64 message packets.

SUMMARY OF THE INVENTION

The object of the present invention, therefore, is to provide a method and an apparatus of the type generally set forth above that reduces the possible loss of message packets.

In a method of the type generally set forth above, the aforementioned object is achieved, according to the present invention, in that, after the separate transmission of the message packets of a message packet group across the redundant switching matrices, the first, faultlessly-transmitted message packet to arrive in a message packet group whose message packets have the auxiliary identifier that is the next following the auxiliary identifier of the most-recently transmitted message packet is forwarded to the serving line coming into consideration and/or in that the switching matrix by way of which the transmission of the message packet occurs most slowly is identified and that the message packets that are faultlessly transmitted as the respective first of their message packet group via the respective, slowest switching matrix, are forwarded to the serving line coming into consideration. This method yields the advantage that the loss of a plurality of message packets corresponding to a message packet cycle that, for example, can cover a plurality of 64 message packets, need not be accepted in case of the absence of the message packet having the auxiliary identifier that is the next to follow the message packet that was most-recently transmitted; rather, on the contrary, the first faultlessly-transmitted message packet of each message packet group is forwarded regardless of its auxiliary identifier.

According to a further development and feature of the invention, the respective slowest matrix is identified by a respective virtual connection in that, in the course of the set-up of a virtual connection, an average counter reading is set for each switching matrix provided in the packet switching equipment and in that the appertaining counter reading of the switching matrix by way of which the message packet just forwarded to the appertaining serving line was transmitted is incremented by the value that corresponds to the plurality of switching matrices provided in the packet switching equipment, reduced by 1, and, accompanying this, the counter reading of the switching matrices that have not transmitted the message packet now being forwarded are deincremented by a value 1 whereby a switching matrix whose counter reading has the respective lowest counter reading for the respective virtual connection is a respective, slowest switching matrix.

This measure yields the advantage that a respectively slowest switching matrix or a plurality of transmitted message packets can be identified for each virtual connection in a particularly simple manner, whereby arbitrary scatters in the transmission speed of the switching matrices are compensated.

It can be provided in a further development and in accordance with a further feature of the invention that a malfunction alarm is triggered when a counter reaches a counter reading during the course of a connection that identifies a switching matrix that, itself, has not transmitted a plurality of forwarded message packets. This measure yields the advantage of a possibility of fault detection that is particularly low in expense.

According to a further development and feature of the invention, it can be provided that, when all counters except one have the highest, or respectively, lowest counter reading that respectively identifies a switching matrix via which no message packet was forwarded for the serving line for a longer time interval, each faultlessly-transmitted message packet that follows the most-recently forwarded message packet is forwarded via the switching matrix belonging to the respective, one counter.

This measure yields the advantage that, given outage of the redundant transmission paths of a virtual connection, each faultlessly-transmitted message packet is forwarded to the appertaining serving line via the switching matrix that is the only one considered capable of transmission.

A circuit arrangement for the implementation of the method of the type set forth above, comprises a handling device for each offering trunk and an evaluation device for each serving line, whereby such a circuit arrangement is characterized, according to the present invention, in that the respective evaluation device respectively forwards that message packet of a message packet group to the allocated output line that arrives first with a auxiliary identifier that follows the auxiliary identifier most-recently transmitted message packet. The evaluation device respectively identifies that switching matrix by way of which the transmission of message packets occurs most slowly and in that the evaluation device forwards message packets that, as the respectively first message packet of their message packet group, are faultlessly transmitted via the respective slowest switching matrix.

The circuit arrangement for the implementation of the method of the present invention yields the advantage of a low circuit-oriented expense for the forwarding of the message packets via the redundantly-designed packet switching equipment.

According to the invention, a circuit arrangement for forwarding message packets transmitted on offering trunks in the course of virtual connections in an asynchronous transfer mode and that have a packet header that identifies the respective virtual connection via a packet switching equipment comprising at least two redundant switching matrices to feed onto serving lines is provided in which each of the offering trunks has a handling device allocated thereto which, first of all, attaches a respective auxiliary identifier that changes for successive message packets-to-message packets transmitted via the respective offering trunk and, secondly, for a respective message packet group of the message packets augmented by the auxiliary identifier and, having a plurality of identical message packets corresponding in number to the plurality of redundant switching matrices which are supplied to the redundant switching matrices, each of the serving lines has an evaluation device allocated thereto which accepts message packets transmitted via the redundant switching matrices and, on the basis of the auxiliary identifier respectively attached to the message packets and, potentially, on the basis of the auxiliary identifier available and just used by the handling device in the formation of a message packet group for the respective virtual connection, outputs only one of the message packets belonging to a message packet group to the allocated serving line.

The circuit arrangement is particularly characterized in that the respective evaluation device forwards that message packet of a message packet group to the allocated output line that arrives first with a auxiliary identifier that follows the auxiliary identifier of the most-recently transmitted message packet, and that the evaluation device respectively identifies that switching matrix by way of which the transmission of message packets occurs most slowly and in that the evaluation device forwards message packets that, as the respective first message packet of their message packet group, are faultlessly transmitted via the respective slowest switching matrix.

According to another feature of the invention, the above circuit arrangement is particularly characterized in that a memory having a plurality of memory locations is provided in the evaluation device, respectively, in which memory locations the auxiliary identifier that is now current for the evaluation of the message packet group is individually stored for the individual virtual connections; and in that the memory locations are respectively selectable for an offering of the storage auxiliary identifier on the basis of particulars respectively contained in the packet header of the message packets and that identify the respective virtual connection, and in that the auxiliary identifier stored in a memory location is updated in response to each selection of a memory location.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of a packet switching equipment employing the techniques of the present invention; and FIG. 2 is a block diagram of a possible structure of an evaluation device in which the method of the present invention is realized and that is only schematically illustrated in single block form in FIG. 1.

DESCRIPTION OF THE PREFERRED EMBODIMENTS

FIG. 1 schematically illustrates a packet switching system PVE to which a plurality of offering trunks E1-En, as well as a plurality of serving lines A1-An are connected. Of these, only the offering trunks E1 and En and the serving lines A1 and An are illustrated in FIG. 1. A respective transmission of message packets in the course of virtual connections according to an asynchronous transfer mode occurs on the offering trunks and serving lines. It is assumed that the message packets be packets having a fixed length that each have a packet header with a respective, virtual channel number as well as an information portion. The respective virtual channel number, here referenced VCI, defines, in accordance with the virtual connection, that serving line to which the respective message packet is to be transmitted. The transmission of the actual message signal occurs in the information portion. As used herein message signals are data and text signals as well as voice or picture signals in digital form. It can also be provided that a check information that is formed with a preceding signal state sequence of the message packet, is attached each of to the message packets.

As proceeds from FIG. 1, a handling device BHE is allocated to each of the offering trunks E1-En. This handling device BHE that, for example, can be represented by a handling device disclosed in the European application 89 103 798.8, corresponding to U.S. Ser. No. 487,220, fully incorporated herein by this reference attaches a auxiliary identifier to message packets belonging to a virtual connection, this auxiliary identifier changing for successive message packets of the respective virtual connection. The auxiliary identifier is composed of a sequence number that is individually set to a defined initial value during the course of the call set up for each virtual connection and that is incremented for each successive message packet. For example, a plurality of 64 successive message packets can form a message packet cycle. The sequence number can then preferably assume a number of states that corresponds to the number of message packets that a message packet cycle covers. The handling device BHE forms two identical message packets from the incoming message packets, each augmented with the auxiliary identifier, these identical message packets being referred to below as message packet groups, and forwards these message packets to two redundant matrices KV1 and KV2 of the message packet switching equipment PVE. It is schematically indicated in FIG. 1 with reference to the switching matrix KV1 that the two switching matrices KV are respectively assumed to comprise a plurality of switch modules SN connected to one another. Since the structure and operation of such switching matrices KV are already well known in the art, the same shall only be discussed below with respect to the operation of a structure for the present invention.

Each of the switching matrices KV comprises a plurality of output lines L11-L1m, L21-L2m. One output line L1 of the switching matrix KV1 and one output line L2 of the switching matrix KV2 are thereby connected in common to a separate evaluation device AWE. These evaluation devices AWE are connected to respective ones of the serving lines A1-An. Such an evaluation device accepts the message packets transmitted via the two switching matrices KV and, on the basis of an evaluation of the auxiliary identifier respectively attached to the message packets and that shall be set forth in greater detail below, outputs only one of the message packets belonging to a message packet group to the allocated serving line A.

It should also be pointed out with respect to the packet switching equipment PVE under consideration that this, in fact, has two redundant switching matrices according to FIG. 1. The number of redundant switching matrices, however, can also be correspondingly increased dependent on the outage possibility of each of the switching matrices KV and on the required values for the availability of the packet switching equipment PVE.

FIG. 2 sets forth a possible structure of the evaluation device AWE illustrated in FIG. 1. The message packet of a message packet group transmitted via the respective output lines L1, L2 first traverse interface devices respectively referenced S1 and S2. The recognition of a beginning of a message packet and the synchronization of the received message packets with the system clock with which the evaluation device AWE is driven respectively occur in the interface devices. A respective check of the transmitted message packets in view of a faultless transmission also occurs in these interface devices, whereby a check with reference to the check information can be added when a respective check information is attached to the message packets. When such a faultless transmission is present, then the interface device S1 delivers the message packet just checked to an intermediate register ZR1. Given a faultless transmission, the interface device S2 supplies the message packet just checked to an intermediate register ZR2 in a corresponding manner. For each faultlessly-transmitted message packet, the packet header, that comprises a channel number VCI belonging to the respective virtual connection and a sequence number that is continuously assigned by the input-side handling device BHE of the packet switching equipment PVE, is additionally supplied to a selection circuit AS. The respective packet header is supplied by the selection circuit AS to a control device MP that can be formed, for example, with a microprocessor and that, as indicated by the broken-line arrow, is connected to a higher-ranking controller (not shown) of the packet switching equipment PVE. The virtual channel number VCI contained in the respective packet header is supplied to a memory SP and, therein, serves the purpose of addressing a plurality of memory locations wherein, among other things, the call-associated sequence number that is set to a defined initial value during the course of the set up of the respective virtual connection is deposited. The memory content of the respectively-addressed memory locations is transferred to the control device MP. A check is carried out in the control device MP to see whether the sequence number supplied by the selection circuit AS is the next sequence number following the most-recently forwarded message packet. Given a positive result, the control device MP, with reference to an auxiliary information W supplied along with the packet header from the selection circuit AS that indicates which switching matrix KV had transmitted the respective message packet, effects the forwarding of the respective message packet from the appertaining intermediate register ZR into a buffer memory PSP that, in a sequence of their input, forwards the accepted message packets to the serving line A that is connected to the respective evaluation unit AWE. This effects a matching of the transmission speed prevailing within the packet switching equipment PVE to the transmission speed of the respective serving line A that is lower in comparison thereto. During this forwarding, the individual message packets pass through a converter CONV in which the auxiliary identifier attached to the message packets in the handling device BHE of the input side is removed. The respective sequence number located in the control device MP and belonging to the message packet being transmitted is stored in the call-associated memory locations; the respective sequence number can thereby be incremented, as a result whereof the identification of the next-successive message packet is limited to a comparison of the respective sequence numbers. In this procedure, a message packet is the respective next message packet following the most-recently forwarded message packet, wherein a comparison of the sequence number carried by the message packet just being transmitted to the sequence number that was most-recently deposited in the memory SP for the virtual connection yields coincidence.

Message packets that are respectively intermediately stored in the intermediate register ZR and that are not forwarded by the control device MP are overwritten by the respective next message packet input into the intermediate register ZR. For each message packet forwarded out of the intermediate register ZR, the sequence number corresponding to the respective transmitted message packet that, for example, can be represented by the incremented sequence number carried in the packet header of the respective message packet is stored in the memory SP with the virtual channel number VCI as an address. In addition to the respective sequence number, the information here referenced W, a plurality of counter readings here referenced Z and an information reference V are stored in a call-associated manner in the memory SP.

A respective switching matrix KV via which the transmission of message packets respectively occurs most slowly can be identified with the assistance of the counter readings Z. During the course of the set up of a connection, the appertaining counter readings Z that are respectively allocated to a switching matrix KV are set to a median counter reading of the highest-possible counter reading. When, for example, the highest-possible counter reading amounts to 1024, then the appertaining counter readings during the set up of a connection can be set to a counter reading of 512. For each forwarded message packet, the organization is then undertaken such that the counter reading of the switching matrix KV by way of which the appertaining message packet was transmitted is incremented by a value that corresponds to the plurality of redundant switching matrices KV in the packet switching equipment PVE, reduced by one, whereas, accompanying this, the counter readings of the switching matrices KV that have not transmitted the appertaining message packet are decremented. When, for example, four switching matrices KV are provided in a packet switching equipment PVE, then the counter reading of the switching matrix KV that has transmitted the respective, forwarded message packet is incremented by the value 3, whereas the counter readings of the other switching matrices KV are respectively incremented by the value 1. A switching matrix KV that has a respective lowest counter reading is interpreted as being the respective slowest switching matrix KV. The message packet respectively transmitted via the redundant switching matrices KV have the next sequence number following the sequence number of the most-recently transmitted message packet that proves faultless in the check in the evaluation unit AWE and is accepted in the respective evaluation unit AWE as the first of its message packet group is forwarded to the serving line coming into consideration. In addition, each message packet has a sequence number following the most-recently transmitted message packet and that was faultlessly transmitted as the first of its appertaining message packet group is forwarded to the serving line A coming into consideration by the respective slowest switching matrix KV. When, during the course of a connection, a counter in the example reaches the lowest counter reading that can be represented by zero, then an outage of the appertaining switching matrix KV can be assumed for the respective virtual connection and measured can be initiated that are comprised in the triggering of a malfunction alarm or therein that, in the forwarding of following message packets for the virtual connection affected, a correspondingly-reduced plurality of redundant switching matrices forms the basis for updating the appertaining counter readings.

It can also be provided that, when all counters except one have the lowest counter reading, an outage of the redundant transmission paths for the respective virtual connection is assumed and forwarding each message packet faultlessly transmitted via the switching matrix KV belonging to the respective one counter that has a sequence number that follows the sequence number of the most-recently transmitted message packet to the serving line A coming into consideration is initiated. When only two redundant switching matrices KV are provided in the packet switching equipment PVE, then it is adequate to provide one counter for each virtual connection, this counter being incremented for each message packet given faultless transmission thereof via the one switching matrix KV as a first of its message packet group and being decremented given a faultless transmission via the other switching matrix. Given a counter reading that is higher than the median counter reading, that switching matrix is the respective fastest switching matrix KV and the other is the respective slowest switching matrix KV, whereas, given a counter reading that lies lower than the median counter reading, the associated switching matrix is the respective slowest switching matrix KV and the other is the respective fastest switching matrix KV. When the counter reading thereby reaches the highest or the lowest counter reading, then an outage of the respective switching matrix KV for the respective virtual connection can be assumed and forwarding each message packet that was faultlessly transmitted via the respective, remaining switching matrix KV as a first of its message group to the serving line coming into consideration can be initiated.

A respective slowest switching matrix KV is identified with the information V. For example, one bit can thus be provided for each switching matrix KV, whereby the set bit can identify a respective slowest switching matrix. When only two redundant switching matrices KV are provided in a packet switching unit PVE, then one bit is adequate for the information V, whereby the set bit can identify the one switching matrix KV as the respective slowest switching matrix, in contrast whereto, the non-set bit can identify the other switching matrix KV as the respective slowest switching matrix. The information V is formed by evaluating the call-associated counter readings Z. When the counter reading Z, as set forth above, have been modified in the control device MP for a forwarded message packet, the control device MP, by comparing the counter readings Z belonging to the respective virtual connection, determined which has a respective lowest counter reading and therefore identifies a respective appertaining switching matrix KV as the respective slowest switching matrix KV and set the information V assigned to such a switching matrix KV in a corresponding manner. The information V, together with the counter readings Z, the information W and the sequence number corresponding to the packet just forwarded are input into the call-associated memory locations of the memory SP. For each packet header that is accepted into the selection circuit AS, the data belonging to the respective virtual connection such as the stored sequence number, the counter reading Z, the information W and the information V, are transferred into the control device MP, whereby a decision as to how the respective message packet is to be handled is made with reference to these appertaining data.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for forwarding message packets transmitted from offering trunks onto serving lines via virtual connections during asynchronous transmission of said message packets, each message packet having a packet header which identifies a respective virtual connection through packet switching equipment comprising a plurality of redundant switching matrices, in which a message packet group having a plurality of identical message packets corresponding in number to the number of redundant switching matrices is formed by duplication of each of the message packets transmitted on one of the offering trunks in the course of a virtual connection, in which an identical auxiliary identifier, which is changed for each of the successive message packet groups, is attached to each message packet of a message packet group, in which the message packets of a message packet group are separately transmitted across the redundant switching matrices in the direction of the serving lines defined by respective virtual connections, and in which only one of the message packets of a message packet group is forwarded to the serving line defined by the virtual connection after such a transmission across the redundant switching matrices on the basis of the auxiliary identifier respectively attached to the message packets, the improvement wherein:

after the separate transmission of the message packets of one of said message packet groups respectively across the redundant switching matrices towards the defined serving line and checking for transmission faults, forwarding a first-arriving faultlessly-transmitted message packet of said one message packet group whose message packets have the auxiliary identifier that is the next following the auxiliary identifier of the most recently-transmitted message packet;

identifying one of said plurality switching matrices via which the transmission of the message packets occurs the slowest; and forwarding to the defined serving line the message packets that ar faultlessly transmitted as the first of their respective message packet group via said slowest switching matrix.

2. The improved method of claim 1, and further defined by:

in the course of setting up a virtual connection, setting an average counter reading for each of the redundant switching matrices of the packet switching equipment;

incrementing the counter reading of the switching matrix, via which the message packet just forwarded to the defined serving line was transmitted, by a value that corresponds to the number of redundant switching matrices reduced by one; and decrementing the counter reading of the switching matrices that have not transmitted the message packet currently being forwarded by a value one, whereby, the switching matrix having the lowest counter reading for the respective virtual connection is identified as the respective slowest switching matrix.

3. The improved method of claim 2, and further defined by:

triggering a malfunction alarm when a counter reading of a switching matrix that has not transmitted a plurality of forwarded message packets reaches a count which can be defined by zero.

4. The improved method of claim 3, and further defined by:

when all counter readings except one have the highest or lowest counter reading that identifies a switching matrix by way of which no message packet was forwarded to the serving line for a predetermined time interval, forwarding each faultlessly-transmitted message packet that follows the most recently-forwarded message packet via the switching matrix associated with that one counter reading.

5. In a circuit arrangement of the type for forwarding message packets transmitted on offering trunks in the course of virtual connections and onto serving lines during asynchronous transmission of message packets, in which each message packet has a header that identifies the respective virtual connection, via a packet switching equipment comprising at least two redundant switching matrices, in which each of the offering lines is connected to each of the switching matrices by a respective handling device which forms message packet groups of identical message packets and attaches a auxiliary identifier to each message packet, which auxiliary identifier is changed for each message packet group, the number of identical message packets of a message packet group corresponding to the number of redundant switching matrices, in which a plurality of evaluation devices connect each of the redundant switching matrices to each of the serving lines, each of said evaluation devices accepting message packets transmitted via the redundant switching matrices and, on the basis of the auxiliary identifier attached to the message packets and the auxiliary identifier just used by a handling device in the formation of a message packet group for a respective virtual connection, outputs only one of the message packets of a message packet group to an allocated serving line, the improvement therein comprising:

forwarding means in each of said evaluation devices for forwarding to the respective serving line the message packet of a message packet group that arrives first with an auxiliary identifier that follows the auxiliary identifier of the most recently-transmitted message packet; and identification means in each of said evaluation means for identifying the redundant switching matrix by which the transmission of message packets occurs the slowest and for forwarding to said serving line those message packets which are the first message packets of their message packet group to have been faultlessly transmitted via said slowest switching matrix.

6. The improved circuit arrangement of claim 5, wherein each of said evaluation devices comprises:

a memory including a plurality of memory locations for storing the respective auxiliary identifier that is current for the evaluation of a message packet group for the individual virtual connections, the memory locations being respectively selectable in response to the contents of the packet headers of the message packets that identify the respective virtual connections; and updating means responsive to each selection of a memory location to up date the auxiliary identifiers stored in the memory locations.

7. The improved circuit arrangement of claim 6, wherein each of said evaluation devices comprises:

means for storing, in addition to a respective current auxiliary identifier, a respective information in the respective memory location identifying the slowest switching matrix for the virtual connection.

* * * * *